United States Patent [19]

Madarame et al.

[11] Patent Number: 4,507,935

[45] Date of Patent: Apr. 2, 1985

[54] OVERHEAT DETECTING DEVICE OF AN AIR CONDITIONING SYSTEM FOR AUTOMOTIVE VEHICLES

[75] Inventors: Michimasa Madarame; Kaichi Ueda, both of Konan, Japan

[73] Assignee: Diesel Kiki Co., Ltd., Saitama, Japan

[21] Appl. No.: 487,520

[22] Filed: Apr. 22, 1983

[30] Foreign Application Priority Data

Apr. 24, 1982 [JP] Japan ............................... 57-59814[U]

[51] Int. Cl.³ ............................................. F25B 49/00
[52] U.S. Cl. .................................... 62/227; 62/323.4; 236/99 D
[58] Field of Search ...................... 62/226, 227, 323.4; 374/208; 337/327, 380; 236/99 D

[56] References Cited

U.S. PATENT DOCUMENTS

| | | | |
|---|---|---|---|
| 2,244,890 | 6/1941 | McGrath | 62/226 X |
| 2,282,441 | 5/1942 | Whitlock | 374/208 X |
| 2,385,243 | 9/1945 | Wiegers | 236/99 D X |
| 3,047,696 | 7/1962 | Heidorn . | |
| 3,686,892 | 8/1972 | Bassett, Jr. . | |
| 3,907,606 | 9/1975 | Chang | 374/208 X |
| 4,038,105 | 7/1977 | Brandeberry et al. | 374/208 X |
| 4,216,902 | 8/1980 | Braukmann | 236/99 D X |
| 4,274,482 | 6/1981 | Sonoda . | |
| 4,404,813 | 9/1983 | Paddock et al. | 374/208 X |

Primary Examiner—William E. Tapolcai
Attorney, Agent, or Firm—Frishauf, Holtz, Goodman and Woodward

[57] ABSTRACT

In an air conditioning system for automotive vehicles, an overheat detecting device is provided for detection of overheating of refrigerant circulated in the air conditioning system. The overheat detecting device is arranged in an outlet pipe connected to the evaporator of the air conditioning system, and accommodated within the evaporator case. The interior of the outlet pipe forms a detecting space for detection of overheating of refrigerant, and the overheat detecting device has a thermo-sensitive means arranged in the detecting space which is interior of the outlet pipe.

9 Claims, 2 Drawing Figures

OVERHEAT DETECTING DEVICE OF AN AIR CONDITIONING SYSTEM FOR AUTOMOTIVE VEHICLES

BACKGROUND OF THE INVENTION

This invention relates to an air conditioning system for automotive vehicles, and more particularly to an overheat detecting device which is provided in an air conditioning system of this kind and adapted to detect abnormal overheating of refrigerant, as caused by a shortage of same in the refrigerating cycle.

Conventionally, an air conditioning system for automotive vehicles, such as a refrigerating system, is provided with an automatic expansion valve so as to control overheating of refrigerant in the air conditioning system. However, the automatic expansion valve has the drawback that, when refrigerant in the refrigerating cycle is leaked below a predetermined amount, the refrigerant in the inlet pipe line to the compressor becomes overheated to such a high level that the automatic expansion valve cannot properly operate, i.e. superheating of refrigerant, resulting in overheating of the compressor. On such occasion, while the temperature of refrigerant in the inlet pipe line to the compressor is abnormally increased, the pressure of the refrigerant is reduced. It is, therefore, possible to detect the overheating of refrigerant by comparing the temperature of the refrigerant and the pressure of same. To detect the temperature and pressure of the refrigerant is known e.g. from U.S. Pat. Nos. 3,047,696 and 3,686,892 wherein are provided overheat detecting devices which are adapted to stop operation of the compressor or to give warning in response to a sensor output signal indicative of detected overheating of refrigerant.

However, according to conventional overheat detecting devices of this kind inclusive of the above proposed ones, a switch means for detecting the overheating of refrigerant is arranged in the suction chamber of the compressor or in the inlet pipe line to the compressor while the compressor is usually installed in the engine room. Accordingly, the switch means is subject to direct heat radiation from the engine. Such conventional overheat detecting device in general comprises a diaphragm which includes two thin plates made of metal and joined together at their peripheral edges, a thermo-sensitive means communicating with the interior of the diaphragm and inserted in a detecting space for detecting of the temperature of refrigerant, such as in the suction chamber of the compressor or the inlet pipe line thereto, and a diaphragm chamber accommodating the diaphragm and communicating with the detecting space. The interior of the diaphragm and the interior of the thermo-sensitive means form an enclosed space in which thermal expansion medium is filled, and the thermal expansion medium has its pressure varying with a change in the temperature of the detecting space. The diaphragm is displaced in response to the difference between the pressure of the thermal expansion medium within the enclosed space and the pressure within the diaphragm chamber, so that it can function as a switch means which controls on-off operation of the driving circuit for the compressor or a warning device. If the overheat detecting device is arranged in a place where it can be easily heated, such as in the suction chamber of the compressor or in the inlet pipe line to the compressor, when the air conditioning system is at rest, the ambient temperature of the overheat detecting device and the temperature of the thermal expansion medium within the enclosed space become the same and sometimes rise up to about 90° C., due to little refrigerant circulation through the detecting space. Further, the pressure in the diaphragm chamber is decreased to a relatively low level since the refrigerant in the diaphragm chamber is drawn into the refrigerating cycle by the compressor. Thus, the difference between the pressure in the diaphragm chamber and the pressure in the enclosed space frequently becomes larger than that where the switch means of the overheat detecting device is closed or turns on as a result of abnormal overheating of the refrigerant. As a consequence, a large stress corresponding to the difference between the pressure in the diaphragm chamber and the pressure in the enclosed space is produced in the diaphragm to displace same beyond its limit of elasticity, sometimes causing permanent deformation of the diaphragm. Further, repeated operation of the refrigerating system can further increase the degree of permanent deformation of the diaphragm, resulting in malfunction of the overheat detecting device.

SUMMARY OF THE INVENTION

It is the object of the invention to provide an overheat detecting device which is arranged in a place where it cannot be heated easily and the refrigerant has a small pressure difference between when the refrigerating system is operating and when it is at rest, to thereby prevent permanent deformation of the diaphragm and ensure accurate detection of abnormal overheating of the refrigerant.

According to the invention, the overheat detecting switch of the overheat detecting device is arranged in an outlet pipe which is connected to the evaporator and accommodated in the evaporator case. During operation of the refrigerating system, the overheat detecting switch can positively detect an increase in the temperature of refrigerant with high accuracy, which is caused by a shortage of refrigerant. While the refrigerating system is at rest, the diaphragm of the overheat detecting switch never suffers from permanent deformation, since the overheat detecting switch is accommodated within the evaporator case where it is free from radiant heat emitted from the engine.

The above and other objects, features and advantages of the invention will be more apparent from the ensuing detailed description taken in connection with the accompanying drawings.

DETAILED DESCRIPTION

The invention will now be described in detail with reference to the drawings.

Figure 1:
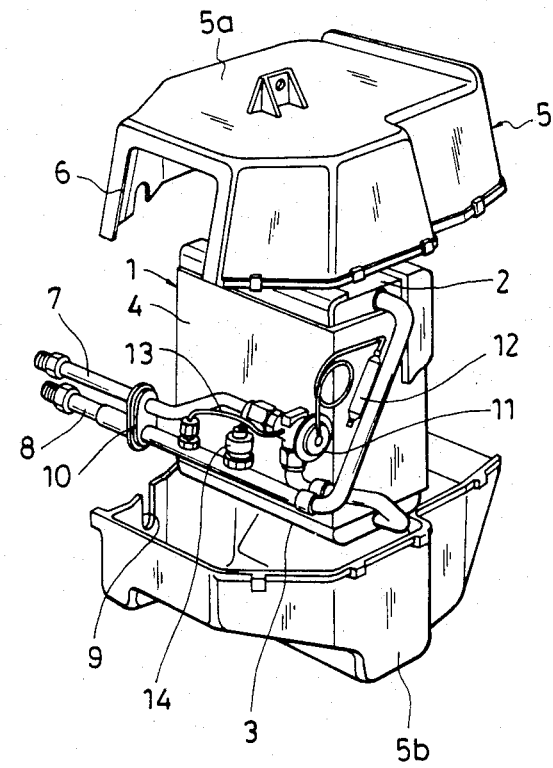
FIG. 1 is a schematic exploded perspective view of an evaporator and its related parts in a refrigerating system for automotive vehicles, to which the overheat detecting device according to the invention is applied.

FIG. 1 illustrates an evaporator and its related parts in a refrigerating system for automotive vehicles, which is provided with an overheat detecting device of the invention. Reference numeral 1 designates an evaporator having a construction as shown by U.S. Pat. No.

4,274,482, which has a laminated structure having hollow bodies each formed of two combined stamped plates and fins which are alternately superposed, not shown. The evaporator 1 further includes a tank 2 formed through the hollow bodies at its upper portion, another tank 3 at its lower portion, and refrigerant passages 4 interconnecting the tanks 2 and 3. The evaporator 1 is accommodated in an evaporator case 5, which is described hereinbelow.

The evaporator case 5, which is usually installed in the passenger compartment of a vehicle, and comprises an upper half 5a and a lower half 5b which are joined together at their peripheral edges by way of clips, not shown. An air inlet opening 6 and an air outlet opening, not shown, are formed in opposite side surfaces of the evaporator case 5 so that they are both opposed to the refrigerant passages 4 on the upstream side and downstream side of the evaporator 1 respectively. Air introduced in through the air inlet opening 6 passes through a plurality of air passages, not shown, which extend between adjacent ones of the refrigerant passages 4 of the evaporator 1 and parallel therewith, so as to be cooled by the refrigerant passing in the passages 4, and discharged through the air outlet opening which is connected to an air outlet, not shown, opening in the vehicle compartment.

An inlet pipe 7 and an outlet pipe 8 have one ends connected to the respective tanks 3 and 2 of the evaporator 1, while they extend along the upstream side of the evaporator 1 and project to the outside from the evaporator case 5 via a through hole 9 formed in the evaporator case 5, into an engine room, not shown, through a firewall, not shown, which partitions the engine room from the vehicle passenger compartment. The other ends of the inlet pipe 7 and the outlet pipe 8 are connected to the condenser and compressor of the refrigerating system, neither of which is shown. The through hole 9 of the evaporator case 5 is snugly fitted with a grommet 10 so as to seal the inlet pipe 7 and the outlet pipe 8 against the evaporator case 5.

An expansion valve 11, which is an automatic thermo-sensitive expansion valve of the external equalizing type, is arranged across the inlet pipe 7, to detect the temperature of refrigerant in the outlet pipe 8 by means of a thermo-sensitive cylinder 12 which is arranged in contact with the outer peripheral surface of the outlet pipe 8. The expansion valve 11 is supplied with the pressure of refrigerant in the outlet pipe 8 through an external equalizing pipe 13 so that the expansion valve 11 can control a throttling amount of refrigerant in the inlet pipe 7 by varying the amount of the refrigerant flowing through the expansion valve 11 so as to keep the overheating of refrigerant constant.

An overheat detecting switch 14, which forms the overheat detecting device of the invention, is arranged in the outlet pipe 8 and accommodated within the evaporator case 5. In the illustrated embodiment, the overheat detecting switch 14 and the expansion valve 11 are disposed on the upstream side of the evaporator 1 and opposite the air inlet opening 6 so that they are directly exposed to air introduced into the evaporator case 5 through the inlet opening 6.

Figure 2:
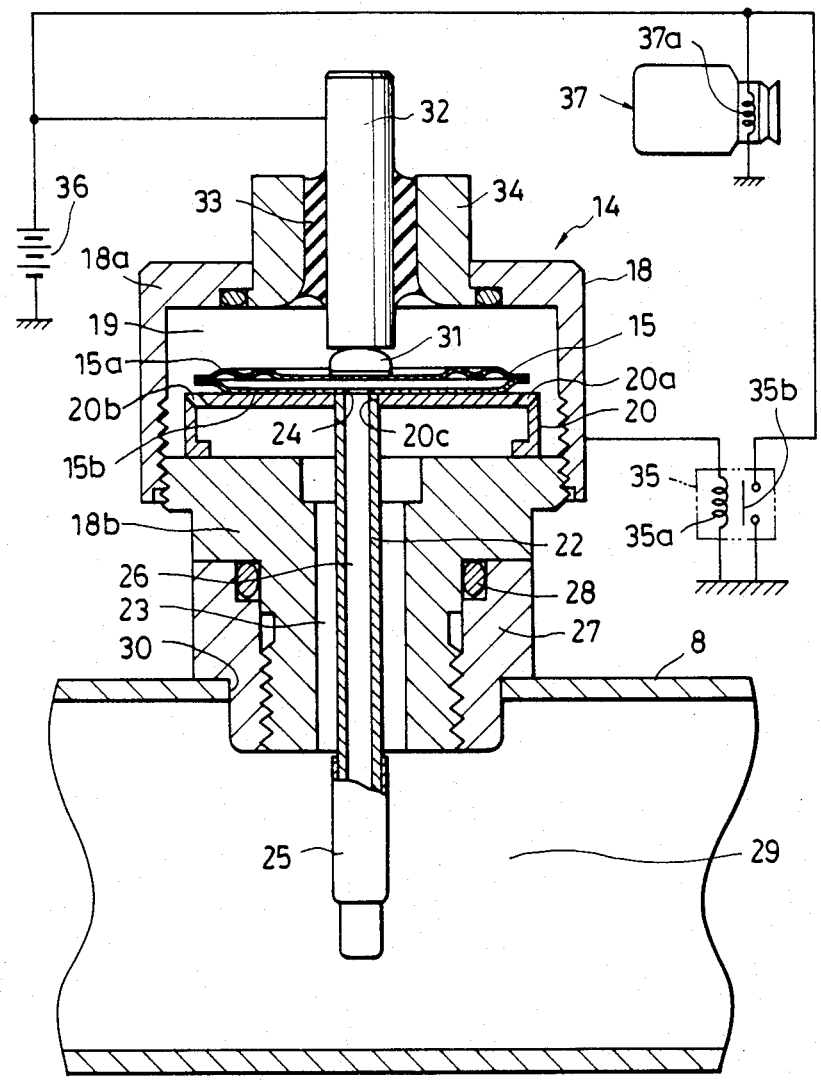
FIG. 2 is a sectional view of an overheat detecting device according to an embodiment of the invention.

The overheat detecting switch 14 has an interior construction as shown in FIG. 2. The outlet pipe 8, which is connected to the evaporator 1, has its peripheral wall formed with an opening 30 to which a fitting flange 27 is secured. The overheat detecting switch 14 is threadedly fitted into the flange 27 through an O-ring 28. The overheat detecting switch 14 has a main body which comprises a casing 18 comprising an upper casing element 18a and a lower casing element 18b which are joined together e.g. by means of brazing. The casing 18 defines therein a diaphragm chamber 19 which accommodates a diaphragm 15. The diaphragm 15 includes two thin metal plates 15a and 15b, which are each disk-shaped and secured to each other at their outer peripheral edges. The metal plates 15a and 15b are each made of metal such as stainless steel and copper alloy, so that they can be elastically deformable in the expansive and contractive directions in response to a stress varying within a predetermined range. The lower metal plate 15a of the diaphragm 15 has its central portion, other than the peripheral edge, fixed to a support member 20 which is secured to the upper surface of the lower casing element 18b of the casing 18. The support member 20 may alternatively be formed integrally with the lower metal plate 15b. The support member 20 has its upper surface formed with communication holes 20a and 20b at its outer peripheral edge, whereby the diaphragm chamber 19 communicates with the interior of the outlet pipe 8 which forms a detecting space 29, through the communication holes 20a, 20b and a passage 23 formed through a central portion of the lower casing element 18b of the casing 18. A communication tube 22 is inserted through the passage 23 of the lower casing element 18b, and has one open end rigidly fitted into a hole 20c formed through a central portion of the support member 20 so that the interior of the communication tube 22 communicates with the internal space of the diaphragm 15 via a hole 24 formed through a central portion of the lower metal plate 15b of the diaphragm 15. The other end of the communication tube 22 projects downward from the passage 23 into the detecting space 29, and enclosedly capped with a cylindrical thermo-sensitive member 25 which is formed of a thin material having high thermal conductivity. Thus, the internal space of the diaphragm 15 communicates with the thermo-sensitive portion 25 by way of the communication tube 22, wherein an enclosed space 26 is defined by the internal space of the diaphragm 15 and the interiors of the thermo-sensitive portion 25 and the communication tube 22. The enclosed space 26 is filled with thermal expansion medium such as freon gas.

A movable contact 31 is secured to the central portion of the upper surface of the upper metal plate 15a of the diaphragm 15. A rod-shaped fixed contact 32 is supportedly fitted through a tubular member 34 via an insulating material 33 such as rubber, the tubular member 34 being rigidly fitted through the upper casing element 18a of the casing 18 in such a manner that the fixed contact 32 has one end opposed to the movable contact 31. The upper metal plate 15a of the diaphragm 15 is movable in response to the difference between the pressure in the diaphragm chamber 19 and the pressure in the enclosed space 26, so as to perform a switching action in cooperation with the movable contact 31.

The movable contact 31 is electrically connected to the relay coil 35a of a relay 35 by way of the diaphragm 15, the support member 20 and the casing 18, while the fixed contact 32 is connected to a power source 36. The power source 36 is also connected to the solenoid 37a of the clutch of a compressor 37, which is connected to the relay 35. When the movable contact 31 is in contact with the fixed contact 32 as shown in FIG. 2, an electrical connection of the relay coil 35a of the relay 35 with the power source 36 is established to energize the relay coil 35a so as to close a contact 35b of the relay 35, whereby the solenoid 37a of the compressor 37 is deenergized to stop the operation of the compressor 37.

Now, the operation of the above device will be described. During normal operation of the refrigerating system, the overheating of the refrigerant discharged from the evaporator 1 into the outlet pipe 8 is kept constant e.g. to 5° C. by the action of the expansion valve 11. Further the air which is introduced into the evaporator case 5 through the air inlet opening 6 cools the overheat detecting switch 14. Thus, the ambient temperature of the thermo-sensitive portion 25 and the temperature in the enclosed space 26 and kept low and accordingly the pressure of the thermal expansion medium in the enclosed space 26 is kept at a low value. On the other hand, the diaphragm chamber 19 is supplied with a constant pressure of saturating refrigerant which is kept at a high value. Consequently, the upper metal plate 15a of the diaphragm 15 is pressed downward toward the lower metal plate 15b, and the movable contact 31 is kept away from the fixed contact 32, whereby the coil 35a of the relay 35 is deenergized with the contact 35b opened.

When the amount of refrigerant in the refrigerating cycle is decreased below a predetermined amount as caused by leakage of refrigerant, the overheating of the refrigerant in the outlet pipe 8 of the evaporator 1 is beyond the control of the expansion valve 11, and accordingly the temperature in the detecting space 29 can rise up to e.g. 60° C., inducing an increase in the pressure of the thermal expansion medium within the enclosed space 26. At the same time, the pressure in the diaphragm chamber 19 decreases as a result that the pressure of the refrigerant in the detecting space 29 is reduced because the flow rate of refrigerant in the inlet pipe 7 is reduced by the throttling action of the expansion valve 11 and simultaneously the refrigerant in the detecting space 29 is continuously drawn by the compressor. Consequently, the upper metal plate 15a of the diaphragm 15 is displaced upward to bring the movable contact 31 into contact with the fixed contact 32 as shown in FIG. 2, whereby the contact 35b of the relay 35 is closed to stop operation of the compressor 37.

When the refrigerating system for automotive vehicles is at rest, the temperature in the enclosed space 26 becomes almost the same with the ambient temperature, due to transmission of heat to the enclosed space 26 from the ambient air, as a result of little circulation of refrigerant through the detecting space 29 in the outlet pipe 8. Since the overheat detecting switch 14 is accommodated within the evaporator case 5 and accordingly free from radiant heat emitted from the engine, the ambient temperature can only rise up to 40° C. at most. On the other hand, although refrigerant is drawn by the compressor into the refrigerating cycle, the pressure in the diaphragm chamber 19 is maintained at a value of e.g. 5–8 kg/cm$^2$G which is higher than a value where the refrigerant is abnormally overheated. Therefore, the difference between the pressure in the diaphragm chamber 19 and the pressure in the enclosed space 26 is kept at a value which is smaller than a value where refrigerant is abnormally overheated. Thus, a stress acting upon the upper metal plate 15a of the diaphragm 15 when deformed is smaller than that in the case of abnormal overheating of the refrigerant, which is within the limit of elasticity of the diaphragm 15, whereby permanent deformation of the diaphragm 15 is prevented.

As described above, according to the invention, the overheat detecting device is arranged in the outlet pipe of the evaporator and accommodated within the evaporator case. Therefore, the ambient temperature of the overheat detecting device never increases to a high level, preventing permanent deformation of the diaphragm, even with repeated operations of the refrigerating system for automotive vehicles. Accurate detection of abnormal overheating of the refrigerant, as caused by a shortage of refrigerant, can be therefore ensured for a long period of time. Further, since the overheat detecting device is arranged opposite the air inlet opening of the evaporator case, the ambient temperature of the overheat detecting device can be kept within a predetermined moderate value during operation of the refrigerating system, ensuring accurate switching operation of the overheat detecting device, without being badly affected by abnormally high ambient temperature which would occur in a conventional arrangement.

Obviously many modifications and variations of the present invention are possible in the light of the above disclosure. It is therefore to be understood that within the scope of the appended claims the invention may be practiced otherwise than as specifically described.

What is claimed is:

1. An air conditioning system for an automotive vehicle, comprising:
    an evaporator installed in the passenger compartment of the vehicle;
    an evaporator case accommodating said evaporator, said evaporator case having side surfaces thereof which have an air inlet opening and an air outlet opening formed therein;
    said evaporator having an upstream side at which it receives air introduced into said evaporator case through said air inlet opening and a downstream side at which it delivers air from said evaporator case through said air outlet opening;
    an inlet pipe connected to said evaporator for feeding refrigerant to said evaporator;
    an outlet pipe connected to said evaporator for discharge or refrigerant from said evaporator, said outlet pipe extending along said upstream side of said evaporator and defining a detecting space interior of said outlet pipe, at least a portion of said outlet pipe being interior of said evaporator case; and
    an overheat detecting device adapted to detect overheating of the refrigerant, said overheat detecting device being coupled to said outlet pipe on said upstream side of said evaporator and being accommodated within said evaporator case, said overheat detecting device being arranged opposite said air inlet opening said evaporator case, and said overheat detecting device comprising means defining a diaphragm chamber, a diaphragm disposed in said diaphragm chamber, said diaphragm having an exterior facing the inside of said diaphragm chamber and an oppositely disposed interior, a thermo-sensitive means arranged in said detecting space interior of said outlet pipe for detecting overheating of the refrigerant in said outlet pipe and communicating with said interior of said diaphragm, an enclosed space being defined by an interior portion of said thermosensitive means and said interior of said diaphragm, said enclosed space extending between said diaphragm chamber and said detecting space interior of said outlet pipe, and said diaphragm chamber communicating with said detecting space interior of said outlet pipe, said diaphragm having a displaceable portion which is displaceable in response to the difference between pressure in said enclosed space and pressure in said diaphragm chamber;

whereby said overheat detecting device is free from radiant heat emitted from the engine of said automotive vehicle, and is exposed to the air introduced into said evaporator case through said air inlet opening.

2. The air conditioning system for an automotive vehicle of claim 1, wherein said overheat detecting device further comprises switch means coupled to said displaceable portion of said diaphragm and which is actuated upon displacement of said displaceable portion of said diaphragm.

3. The air conditioning system for an automotive vehicle of claim 2, wherein said exterior of said diaphragm comprises said displaceable portion of said diaphragm.

4. The air conditioning system for an automotive vehicle of claim 1, wherein said exterior of said diaphragm comprises said displaceable portion of said diaphragm.

5. The air conditioning system for an automotive vehicle of claim 4, wherein said diaphragm comprises first and second oppositely disposed elements defining said interior therebetween, one of said oppositely disposed elements comprising said displaceable portion of said diaphragm; and means defining an elongated space extending between the interior portion of said thermosensitive means and said interior defined between said first and second diaphragm members; said enclosed space comprising said interior of said diaphragm and said elongated space.

6. The air conditioning system for an automotive vehicle of claim 7, wherein said enclosed space comprises a thermal expansion medium contained therein.

7. The air conditioning system for an automotive vehicle of claim 6, wherein said thermal expansion medium comprises freon gas.

8. The air conditioning system for an automotive vehicle of claim 1, wherein said enclosed space comprises a thermal expansion medium contained therein.

9. The air conditioning system for an automotive vehicle of claim 8, wherein said thermal expansion medium comprises freon gas.

* * * * *

UNITED STATES PATENT AND TRADEMARK OFFICE
CERTIFICATE OF CORRECTION

PATENT NO. : 4,507,935

DATED : April 2, 1985

INVENTOR(S) : Michimasa MADARAME, et al

It is certified that error appears in the above-identified patent and that said Letters Patent is hereby corrected as shown below:

COLUMN 8 (Claim 6), line 15, change "claim 7" to

--claim 5--.

Signed and Sealed this

Fifteenth Day of October 1985

[SEAL]

Attest:

DONALD J. QUIGG

Attesting Officer

Commissioner of Patents and
Trademarks—Designate